H. W. KINNEY.
COMPOUND GAS ENGINE.
APPLICATION FILED MAY 16, 1918.
1,320,241.
Patented Oct. 28, 1919.
2 SHEETS—SHEET 1.
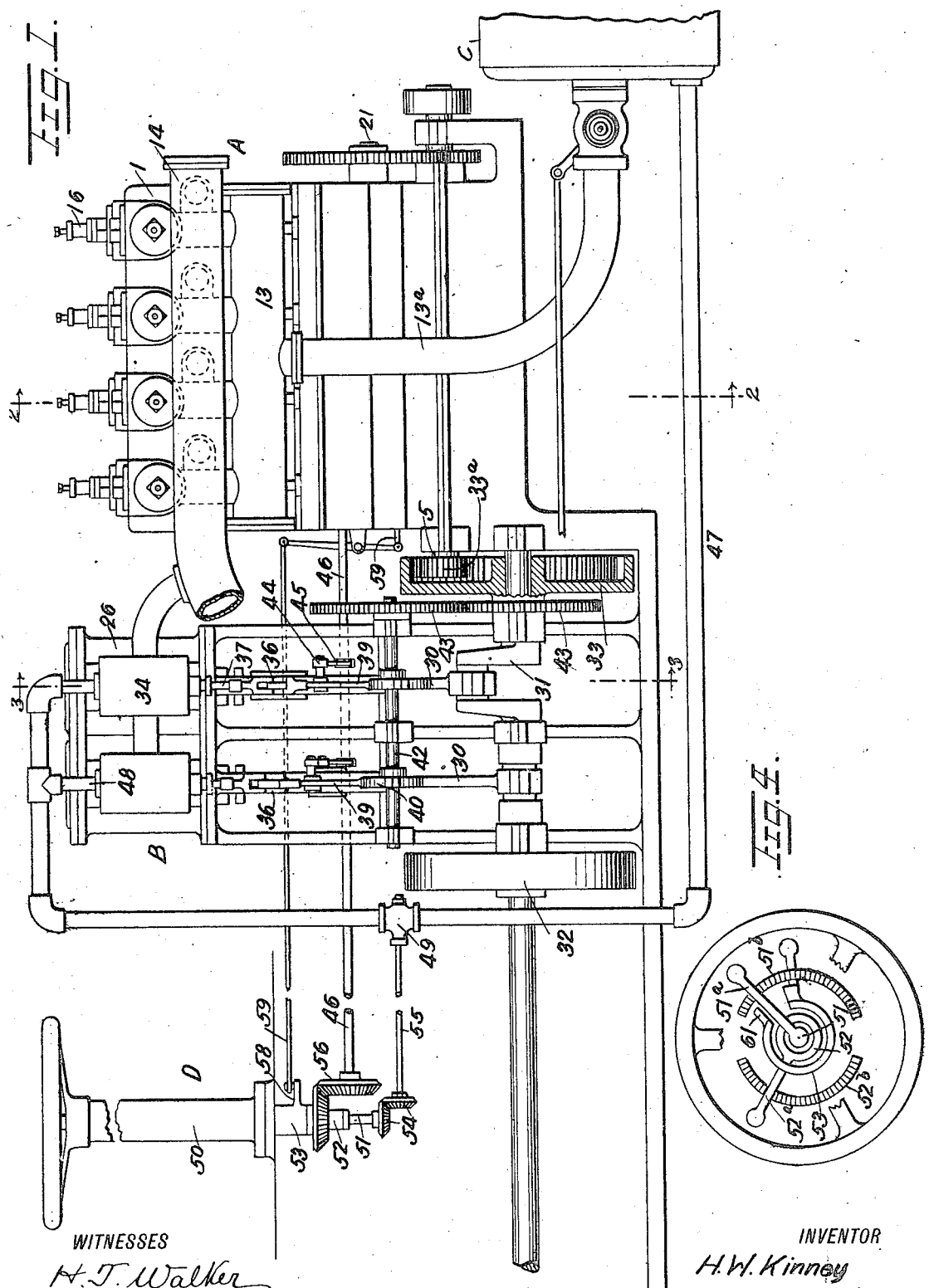
WITNESSES
H. J. Walker
C. Bradway
INVENTOR
H. W. Kinney
BY
ATTORNEYS

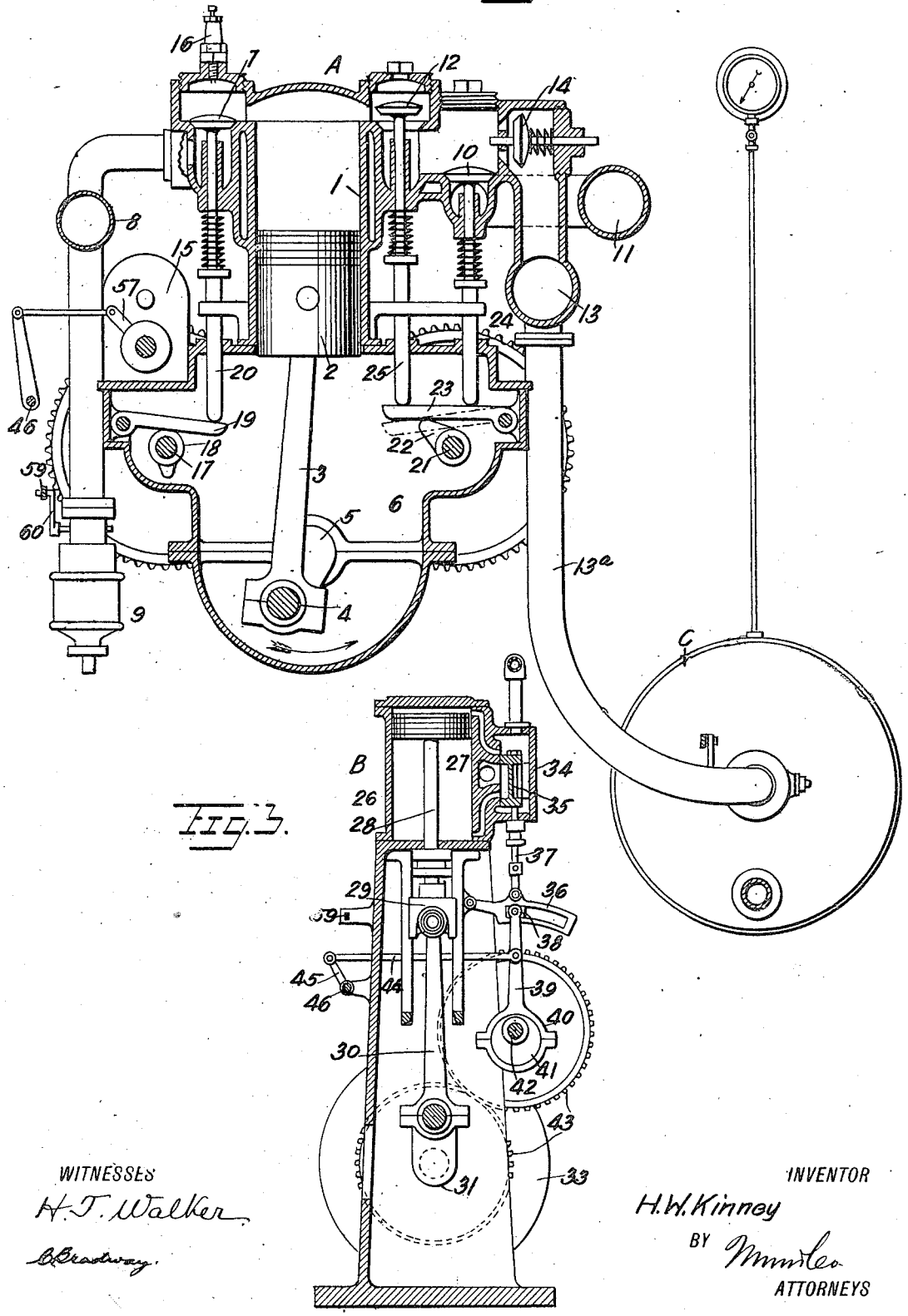

UNITED STATES PATENT OFFICE.

HARRY WHITCOMB KINNEY, OF LYNCHBURG, VIRGINIA.

COMPOUND GAS-ENGINE.

1,320,241.          Specification of Letters Patent.          Patented Oct. 28, 1919.

Application filed May 16, 1918. Serial No. 234,966.

*To all whom it may concern:*

Be it known that I, HARRY W. KINNEY, a citizen of the United States, and a resident of Lynchburg, in the county of Campbell and State of Virginia, have invented a new and Improved Compound Gas-Engine, of which the following is a full, clear, and exact description.

This invention relates to internal combustion engines and has to deal more particularly with a compound engine or power plant for automobiles or other uses, whereby additional power can be obtained from the products of combustion, greater flexibility secured, as well as facility in starting.

A more specific object of the invention is the provision of a novel combination of a main explosive engine, with means such as a pressure reserve tank to which products of combustion are admitted through a special valve before the piston of the engine reaches the end of its working stroke, and from this tank fluid under pressure is supplied to an auxiliary reciprocatory engine of the expansive or steam type geared or otherwise connected to the main engine and also connected with the driving wheels of the automobile or other load to be driven, whereby the auxiliary engine can be used for starting the main engine or for driving the automobile when low speed is required.

With such and other objects in view, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a side view of the power plant with portions broken away and in section;

Figs. 2 and 3 are vertical sections respectively on the lines 2—2 and 3—3, Fig. 1; and Fig. 4 is a plan view of the controlling stand.

Referring to the drawings, A designates the main engine, B the auxiliary engine, C the reserve pressure tank, and D the controlling stand.

The main engine shown in the present instance is of the four-cylinder type, but the number of cylinders is immaterial. Referring to Fig. 2, 1 designates a cylinder, 2 the piston therein, 3 the connecting rod, 4 the crank, 5 the crank shaft, 6 the crank chamber, 7 the inlet valve, 8 the mixture manifold, 9 the carbureter, 10 the exhaust valve, 11 the exhaust manifold, 12 the reserve pressure valve, 13 the reserve pressure manifold, 14 the check valve between the valve 12 and manifold 13, and 15 is the magneto or other source of current for the spark plug 16. The engine includes a secondary shaft 17 driven from the main shaft in the usual manner, and on the secondary shaft is a cam 18 which operates a lifter 19 on which bears the lower end 20 of the inlet valve stem 7 for opening the valve at the proper time in relation to the stroke of the piston 2. The exhaust valve 10 is operated by another secondary shaft 21 which has a cam 22 for actuating the lifter 23 that engages the lower end of the valve stem 24 of the exhaust valve 10. This lifter is also employed to operate the valve stem 25 of the valve 12, but the lifter 23 is so related to the valve stems 24 and 25 that the valve 12 will open during the latter part of the down stroke of the piston 2 while the exhaust valve 10 will begin to open at about the time the piston 2 begins to move upwardly. In other words, the valve 12 opens before the valve 10, so that the exploded gases while still under considerable pressure will flow out of the cylinder 1, through the valves 12 and 14, to the reserve pressure manifold, and from the latter through the pipe 13ᵃ to the receiver or tank C.

The auxiliary engine B comprises cylinders 26 each having a piston 27 connected by a rod 28 with a cross-head 29 connected by a connecting rod 30 with a crank shaft 31, which latter has a flywheel 32 and a gear 33 meshing with a pinion 33ᵃ on the main engine shaft 5. Each cylinder has a valve chest 34 in which is a slide valve 35 operated by a cut-off mechanism composed of a link 36 connected with a valve rod 37 and in which slides a block 38 connected with an eccentric rod 39 formed with a strap 40 which encircles the eccentric 41 on a secondary shaft 42 connected by gears 43 with the main shaft 31, the eccentric rod 39 being shifted in any suitable manner, as, for instance, by a link 44 connected by an arm 45 with a rock shaft 46. In this manner the cut-off of the slide valve can be varied to get any expansive effect of the motive fluid acting on the piston 27. The motive fluid for the auxiliary engine is derived from the receiver or tank C, from which leads a pipe 47 connected at 48 with the valve chests 34 and having a throttle valve 49.

The controlling stand D comprises a column 50 in which are arranged concentric rotary elements 51, 52, 53, the first being connected in any suitable manner, as, for instance, by a gear 54, with the stem 55 of the auxiliary engine throttle valve 49, and the element 52 is connected by gears 56 with the rotary shaft 46, which operates the link motion of the auxiliary engine, and also the timer arm 57 of the magneto 15 of the main engine. The upper end of the shaft 51 is provided with a handle or lever 51$^a$, as shown in Fig. 4, and the upper end of the shaft or element 52 is provided with a handle or lever 52$^a$. These handles move over toothed sectors 51$^b$ and 52$^b$, respectively. The outer element or shaft 53 has an arm 58 connected by a rod 59 with the lever 60 of the carbureter 9, and on the upper end of the shaft 53 are spaced lugs 61, 62, between which the controlling arm 51$^a$ engages with limited lost motion, so that in starting the lever 51$^a$ first admits fluid under pressure to the auxiliary engine, and then by moving this lever still further the throttle valve of the carbureter is operated to admit an increased quantity of mixture to the main engine. It will thus be seen that one controlling lever will control both the auxiliary and main engines.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. In an engine, the combination of a cylinder, a piston, means for admitting an explosive mixture to the cylinder, a valve through which the products of combustion pass from the cylinder, an exhaust valve, means for operating the first-mentioned valve during the latter part of the working stroke of the piston and before the exhaust valve opens, whereby products of combustion under pressure flow out of the cylinder, a manifold into which pass the products of combustion flowing past the first-mentioned valve while the exhaust valve is closed, a receiver connected with the manifold, a check valve between the first valve and the manifold and opening toward the manifold and closing toward the engine to hold the pressure in the receiver, a second engine coupled to the first and operating expansively, means for connecting the receiver with the second engine including a valve chest and valve, and a throttle in the connection between the receiver and second engine for controlling the supply of fluid to the latter.

2. An engine comprising a cylinder, a piston therein, means for admitting explosive mixture to the cylinder, an exhaust valve, an additional valve between the exhaust valve and cylinder, an exhaust outlet leading from the exhaust valve, a receiver for communication with the cylinder when the second-mentioned valve is opened and the exhaust valve is closed, a common means for opening the exhaust valve at a suitable time after the opening of the second-mentioned valve, whereby products of combustion will flow to the receiver before the piston begins its exhaust stroke, and a check valve between the receiver and the second-mentioned valve and opening toward the receiver.

3. The combination of a main engine of the explosive type, a receiver connected therewith for receiving products of combustion under pressure, a secondary engine of the expansion type, a throttle between the receiver and the secondary engine, a throttle for the main engine, and a controller for first opening the throttle of the secondary engine and thereafter opening the throttle of the main engine.

4. The combination of an explosive engine and an ignition system including a timer, with an expansive engine receiving fluid under pressure from the exhaust of the explosive engine, a cutoff valve mechanism for the expansive engine, and a controller common to the said timer and said valve mechanism.

5. In an internal combustion engine, a cylinder, means for admitting an explosive mixture into the cylinder, a piston in the cylinder, an exhaust valve, a second exhaust valve between the first valve and the cylinder, a receiver for receiving the exhaust products of combustion flowing past the second valve while the first valve is closed, a pivoted arm with which the stems of the said valves engage, the stem of the second valve engaging the outer end of the arm, a secondary shaft arranged below the arm and having a cam engaging said arm, and means for operating said shaft.

6. In an internal combustion engine, a cylinder, means for admitting an explosive mixture to the cylinder, a piston in the cylinder, an exhaust valve, a second exhaust valve between the first valve and the cylinder, a manifold for receiving the exhaust products of combustion from the second valve, a receiver connected with the manifold, a check valve between the second valve and manifold, means for operating said valves, said means opening the second valve first, a second cylinder, a piston therein, a valve chest on the cylinder, a valved connection between the receiver and valve chest, a valve in the said chest, a cut-off mechanism connected with the valve, a rock shaft, a connection between the rock shaft and cut-off mechanism.

7. In an internal combustion engine, a cylinder, means for admitting an explosive mixture into the cylinder, a magneto timer, a receiver, means for admitting the exhaust products of combustion of the cylinder into the receiver, a second cylinder, a piston therein, a valve chest on the cylinder, a valve in the chest, a cut-off mechanism for the valve, a rock shaft, a connection between the cut-off mechanism and the rock shaft, a connection between the magneto and rock shaft, and means for operating the rock shaft.

8. In an internal combustion engine, a cylinder, a piston in the cylinder, a carbureter having a throttle valve, a connection between the carbureter and cylinder, a receiver, means for admitting the exhaust products from the cylinder into the receiver, a second cylinder, a piston in the cylinder, a connection between the receiver and second cylinder, a valve for controlling the admission of the exhaust products of combustion into said second cylinder, an operating lever, and means for operating the valves from the said lever.

HARRY WHITCOMB KINNEY.